United States Patent [19]
Ashton

[11] 4,059,862
[45] Nov. 29, 1977

[54] DOUBLE WRAPAROUND BRUSH ASSEMBLY FOR VEHICLE WASHING APPARATUS

[75] Inventor: Shirley B. Ashton, Lavergne, Tenn.

[73] Assignee: The Smith Company, Brentwood, Tenn.

[21] Appl. No.: 697,536

[22] Filed: June 18, 1976

[51] Int. Cl.² .............................................. B60S 3/06
[52] U.S. Cl. ............................ 15/53 AB; 15/DIG. 2
[58] Field of Search .......... 15/DIG. 2, 53 A, 53 AB, 15/97 B

[56] References Cited

U.S. PATENT DOCUMENTS

| 3,432,870 | 3/1969 | Emanuel et al. | 15/53 AB |
| 3,581,334 | 6/1971 | Follis | 15/53 AB |
| 3,638,265 | 2/1972 | Fuhring et al. | 15/53 AB |
| 3,839,762 | 10/1974 | Baker | 15/53 AB |

FOREIGN PATENT DOCUMENTS

| 1,933,414 | 1/1971 | Germany | 15/DIG. 2 |

*Primary Examiner*—Edward L. Roberts
*Attorney, Agent, or Firm*—Harrington A. Lackey

[57] ABSTRACT

A double wraparound brush assembly for a vehicle washing apparatus including a control arm having one end pivotally mounted to the frame of the apparatus above the path of the vehicle, a brush arm having one end pivoted to the other end of the control arm, and a brush beam, supporting a pair of driven rotary brushes at each end, journaled at its middle portion to the other end of the brush arm, and control means for the control arm and the brush arm.

3 Claims, 24 Drawing Figures

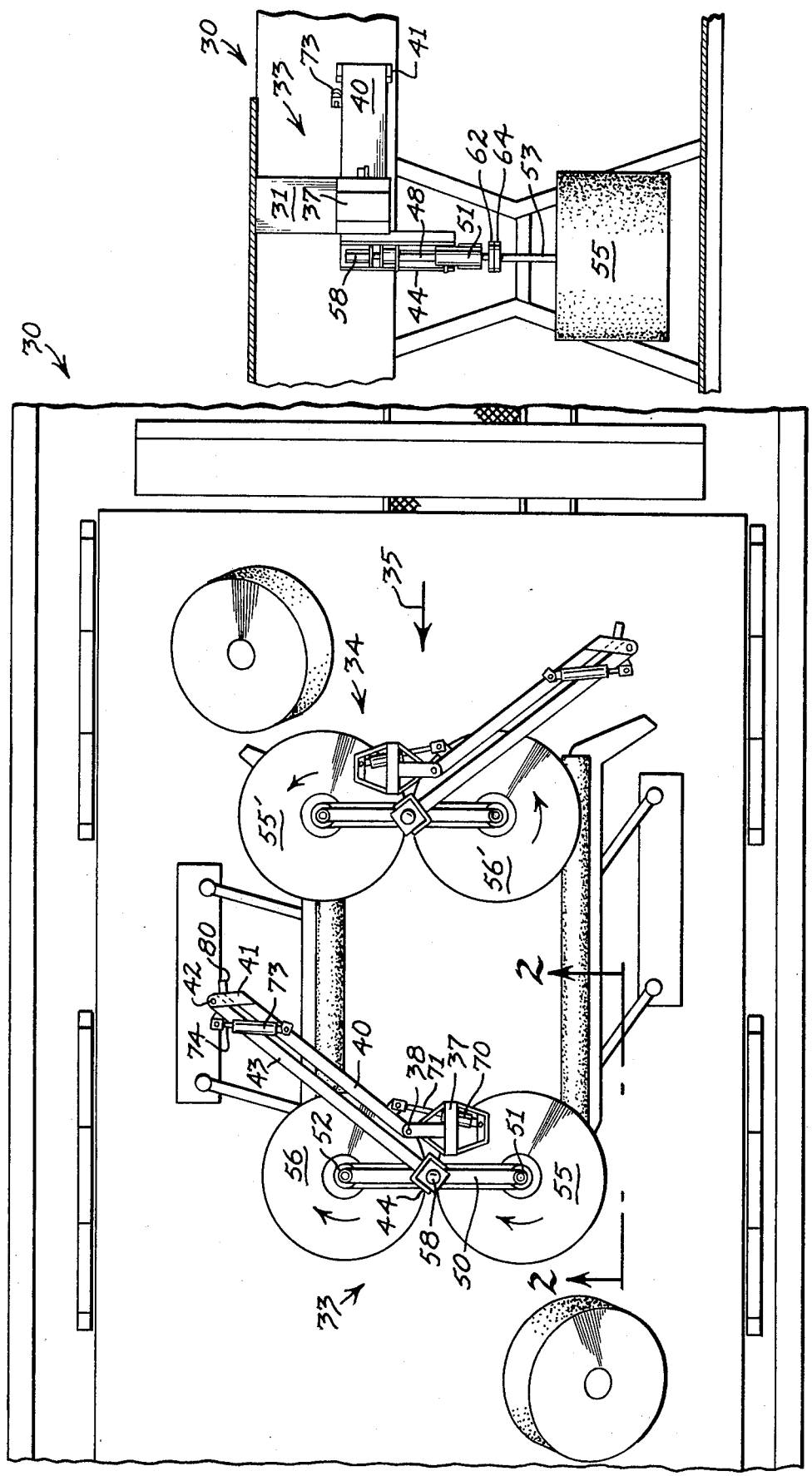

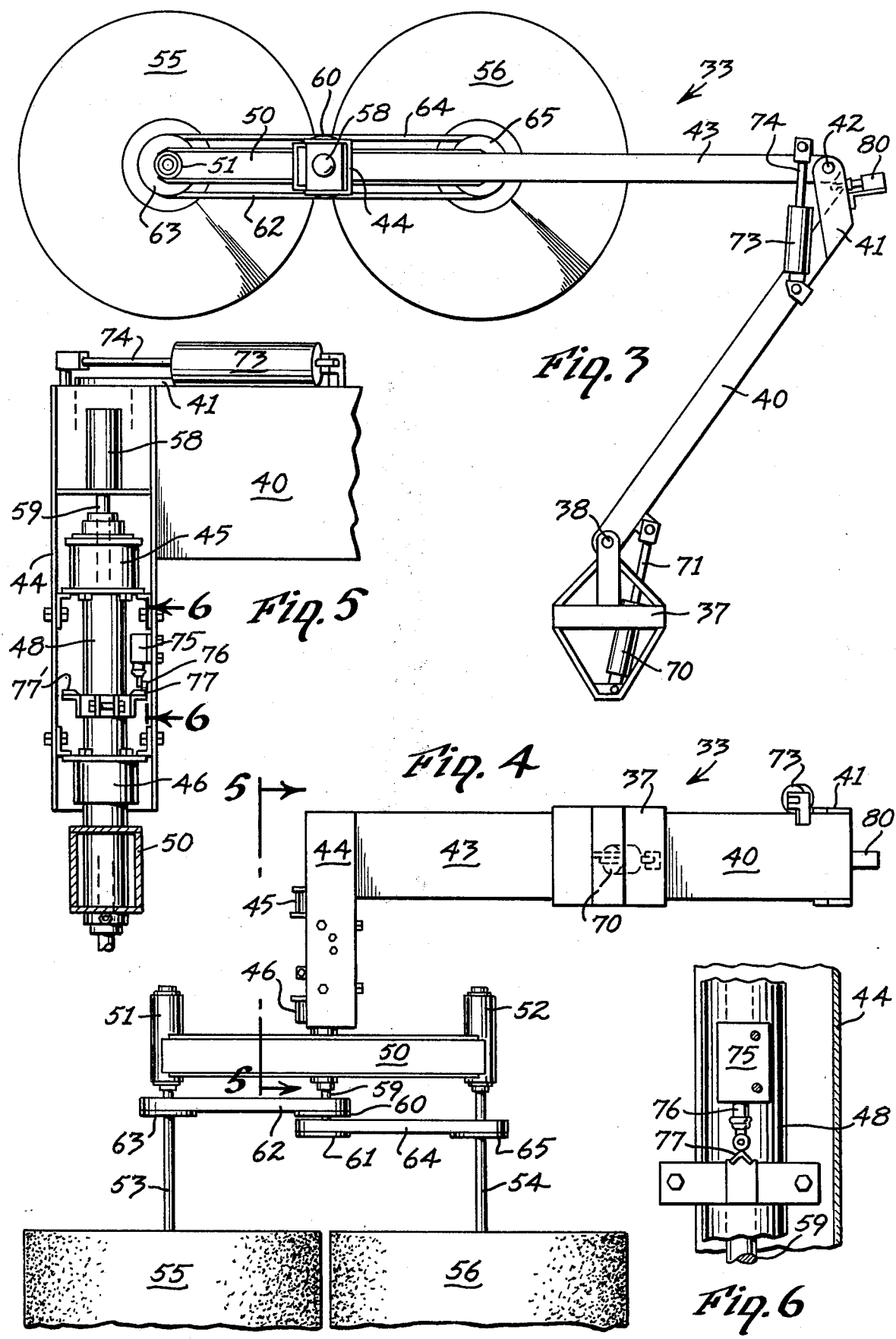

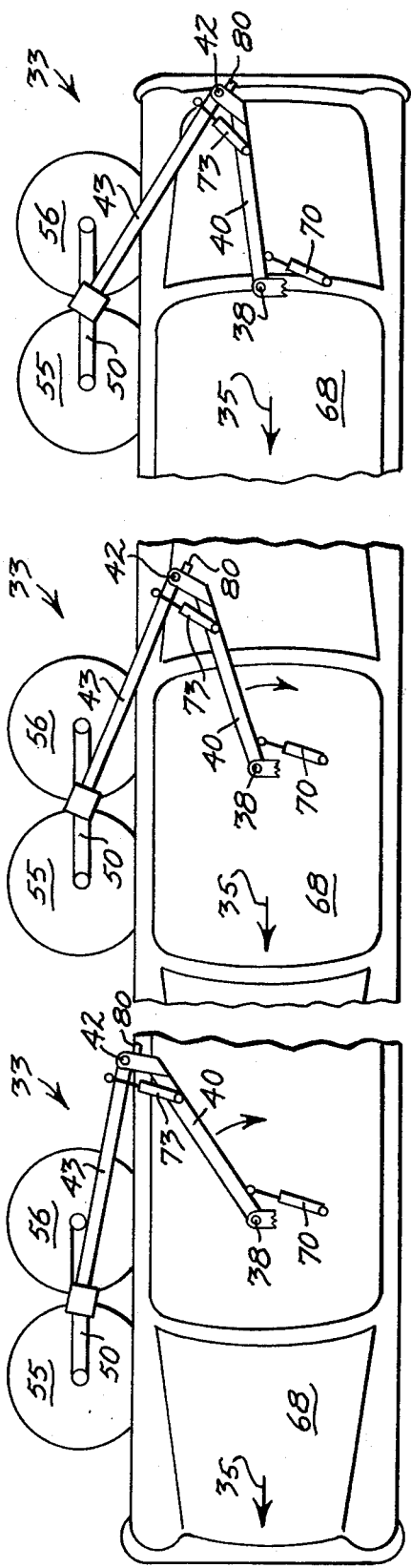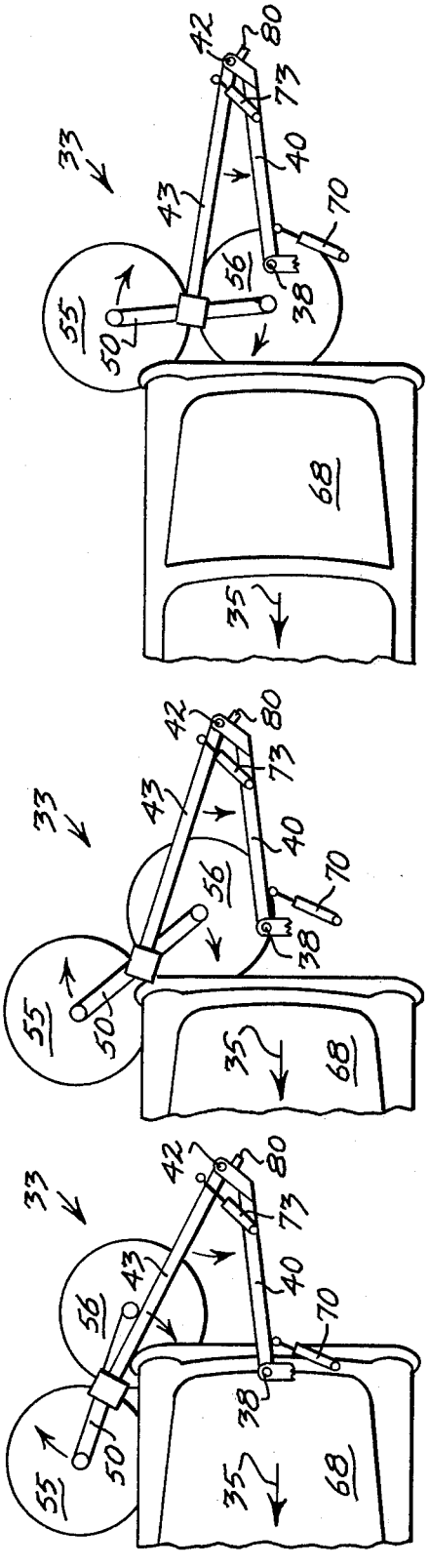

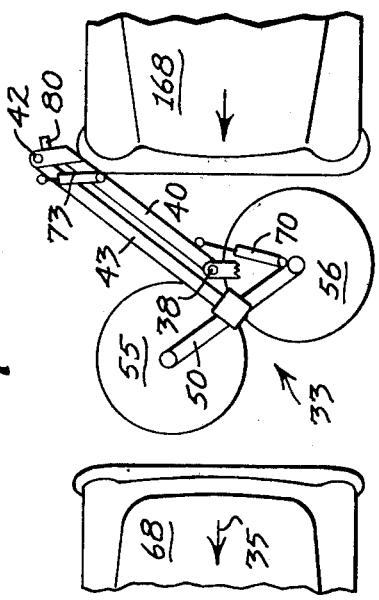
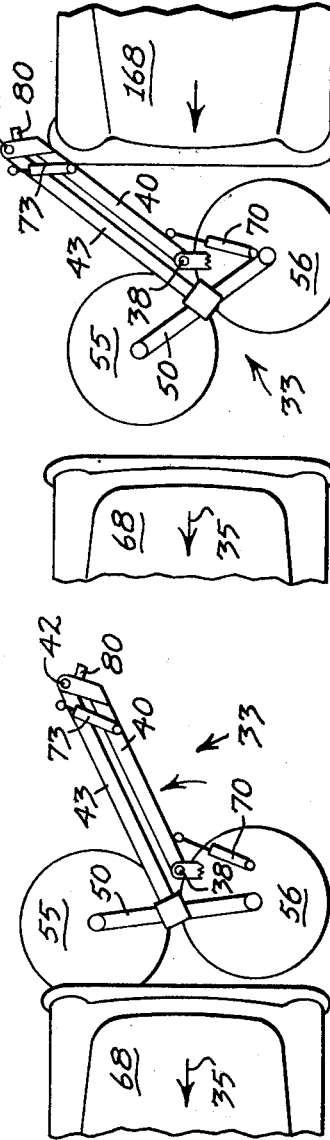
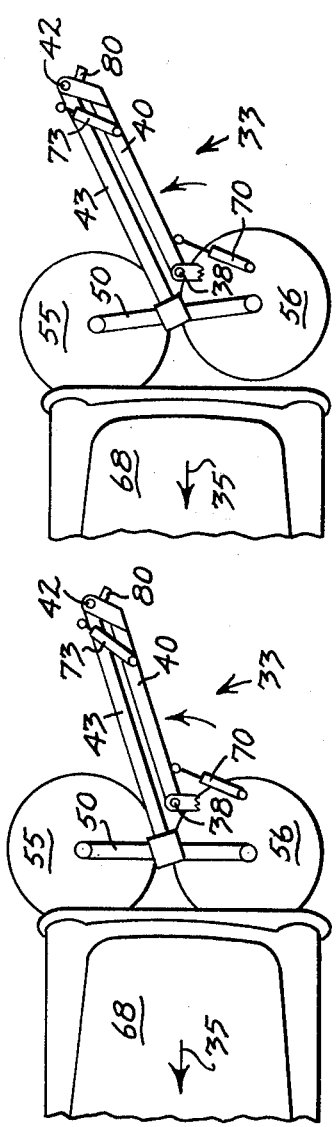
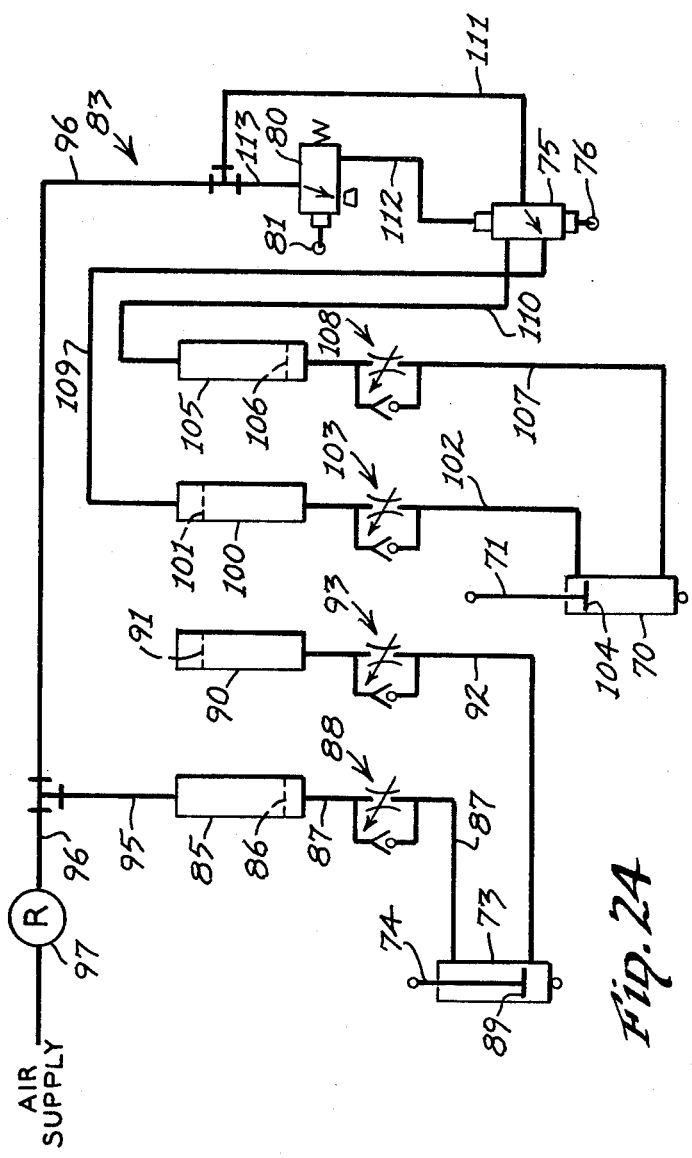

DOUBLE WRAPAROUND BRUSH ASSEMBLY FOR VEHICLE WASHING APPARATUS

BACKGROUND OF THE INVENTION

This invention relates to vehicle or car-washing apparatus, and more particularly to a double wraparound brush assembly for the washing apparatus.

Wraparound brushes mounted on pivotal arms having means for driving the rotary brushes for engaging and cleaning the front and side surfaces of a vehicle or the side and rear surfaces of a vehicle are well-known in the art.

Double wraparound brush assemblies are also known, as disclosed in U.S. Pat. No. 3,839,762 and the Dutch Pat. No. 6,706,366 (1967).

SUMMARY OF THE INVENTION

It is an object of this invention to provide a double wraparound brush assembly for a vehicle washing apparatus, in which the double brushes will clean a greater surface area of the vehicle, and specifically, not only the side surface of the vehicle, but also a greater portion of the front and rear surfaces.

It is a further object of this invention to employ a pair or set of the double wraparound brushes so that portions of the front and rear surfaces of the car are cleaned at least three times for each pass of the vehicle through the sets of brushes.

More specifically, this double wraparound brush assembly includes a control arm having one end pivotally connected to a portion of the support or frame of the vehicle washing apparatus above the path of the vehicle through the apparatus. The other end of the control arm is pivotally connected to one end of a brush arm, while the opposite end of the brush arm is journaled to the middle portion of a brush beam. A pair of brushes are journaled at opposite ends of the brush beam so that the brush beam is balanced, and both of the brushes are driven in the same direction.

Control means are provided for causing the rotary brushes not only to constantly bear against the surfaces of the moving vehicle through the apparatus, but also to remain on the surface longer and thereby clean a greater surface area of the vehicle before the brushes lose contact with the moving vehicle.

These controls essentially include a fluid dashpot means connected between the control arm and the brush arm to constantly bias the arms together, and a fluid cylinder actuator reversible for swinging the control arm in a limited arc between an outboard position and a longitudinally extending rearward position. The fluid control cylinder is reversed by a rotary position sensor in the form of a control valve actuable as the brush beam rotates to a predetermined angular position relative to the brush arm, as the brushes swing from the forward surface of the vehicle to the side surface of the vehicle. A re-set control sensor is positioned between the control arm and the brush arm for actuation to reverse the fluid cylinder when the control arm and brush arm coverage to a predetermined angle.

BRIEF DESCRIPTION OF THE DRAWINGS

FIG. 1 is a top plan view of a section of a vehicle washing apparatus, incorporating a pair of the double wraparound brush assemblies made in accordance with this invention and in their normal position preparatory to engagement by a forward-moving vehicle;

FIG. 2 is a fragmentary section taken along the line 2—2 of FIG. 1;

FIG. 3 is an enlarged top plan view of one of the brush assemblies in an operative position for washing the side of a vehicle;

FIG. 4 is a fragmentary side elevation of the brush assembly disclosed in FIG. 3;

FIG. 5 is an enlarged fragmentary section taken along the line 5—5 of FIG. 4;

FIG. 6 is an enlarged fragmentary section taken along the line 6—6 of FIG. 5;

FIGS. 7-22 are sequential, top plan, schematic views of the operation of one of the brush assemblies upon a forward-moving motor vehicle;

FIG. 23 is an enlarged fragmentary plan view, with portions broken away, of the control elements between the brush arm and the control arm; and FIG. 24 is a schematic fluid circuit diagram of the controls for the brush assembly.

DESCRIPTION OF THE PREFERRED EMBODIMENTS

Figure 10:
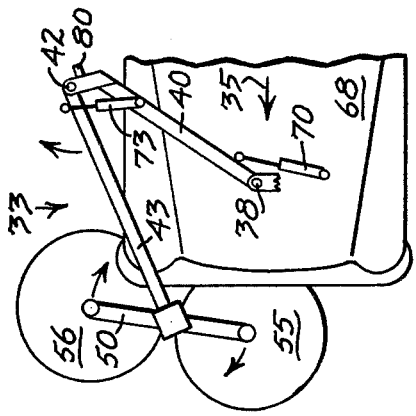

Referring now to the drawings, FIGS. 1 and 2 disclose a portion of a vehicle or car washing apparatus 30 including an overhead frame 31.

FIG. 1 discloses a pair of the double wraparound brush assemblies 33 and 34, the brush assembly 33 being located in front of the brush assembly 34 directly in the path of a motor vehicle moving forward through the apparatus 30 in the direction of the arrow 35 (FIG. 1).

The front brush assembly 33 includes a pivotal mounting bracket 37 fixed to the overhead frame 31 above the path of the vehicle through the apparatus 30. Pivotally mounted to the bracket 37 by a pivot pin 38 is one end of the control arm 40. The opposite end of the control arm 40 is provided with a connecting bracket 41 through which is mounted a pivot pin 42 pivotally connected to one end of a brush arm 43.

Fixed to the opposite end of the brush arm 43, as disclosed in FIGS. 4 and 5 is a depending tubular housing 44. Journaled within bearings 45 and 46 fixed within the tubular housing 44 is a vertical hollow shaft 48. The lower end of the shaft 48 is fixed to the brush beam 50, in the form of a box beam, midway between the opposite ends of the brush beam 50.

Fixed to the opposite ends of the brush beam 50 are brush shaft bearings 51 and 52 supporting for rotary movement about vertical axes the brush shafts 53 and 54, respectively.

Fixed to the bottom end of each of the brush shafts 53 and 54 is a rotary car wash brush 55 and 56 of any conventional type, such as car wash brushes formed of plastic strips.

Mounted in the top of the housing 44 is a brush motor 58 (FIG. 5), which drives a lay or drive shaft 59 journaled for independent rotary movement coaxially within the hollow shaft 48. To the bottom of the drive shaft 59 are fixed a pair of drive gear belt sprockets 60 and 61. A gear belt 62 trained about the drive sprocket 60 is also trained about the driven gear belt sprocket 63 fixed to the brush shaft 53. In like manner, a gear belt 64 is trained about the drive gear belt sprocket 61 and the driven gear belt sprocket 65 fixed to the brush shaft 54. In this manner, energization of the brush motor 58 drives both brushes 55 and 56 in the same rotary direction and at equal rotary speeds.

In order to control the movement of the rotary brushes 55 and 56 relative to a motor vehicle 68 (FIGS.

7-22) moving in the forward direction of the arrow 35 through the apparatus 30, a fluid position cylinder 70 is pivotally connected to the bracket 37, with its reciprocal piston rod 71 pivotaly connected to an adjacent portion of the control arm 40, as best disclosed in FIG. 3.

A fluid pressure cylinder 73 is pivotally connected to the opposite end portion of the control arm 40, with its piston rod 74 pivotally connected to an adjacent portion of the brush arm 43, also as best disclosed in FIG. 3.

A fluid control valve 75 is mounted on the inside of the tubular housing 44 (FIGS. 5 and 6) having a depending valve actuator 76 in the form of a cam follower adapted to be actuated by a cam switch 77. The cam switch 77 is fixed to the hollow shaft 48 for rotary movement with the hollow shaft 48 relative to the valve actuator 76.

A re-set valve 80 is fixed to the bracket 41 and is provided with an extending valve actuator 81 adapted to be engaged for actuation by a surface of the brush arm 43 when converging to a predetermined position relative to the control arm 40, as best disclosed in FIG. 23.

FIG. 24 discloses schematically a fluid circuit 83 for controlling the cylinders 70 and 73 and the fluid valves 75 and 80.

An oil bottle 85 having an oil level 86 is connected through fluid or oil line 87 and a flow control valve mechanism 88 to the pressure cylinder 73 on one side of the piston 89. A second oil bottle 90 having an oil level 91 is connected through oil line 92 and flow control valve 93 to the pressure cylinder 73 on the opposite side of the piston 89. The top of the oil bottle 85 communicates through a branch air line 95 to an air supply line 96, through which air is supplied at a pressure controlled by the air regulator 97.

A third oil bottle 100 having oil level 101 is connected through oil line 102 and flow control valve mechanism 103 to the piston cylinder 70 on one side of the piston 104. A fourth oil bottle 105 having oil level 106 is connected through oil line 107 and flow control valve mechanism 108 to the position cylinder 70 on the opposite side of the piston 104. The tops of the oil bottles 100 and 105 are connected through air lines 109 and 110, respectively, to the control valve 75. The opposite side of the control valve 75 is connected by branch air line 111 to the air supply line 96. One end of the control valve 75 is connected through an air line 112 to the re-set valve 80, the other side of which is connected through air line 113 to the air supply line 96.

The control valve 75 functions in such a manner that when the valve actuator 76 is engaged by the cam switch 77 in one direction, flow of air is reversed through the lines 109 and 110. The re-set valve 80 also functions in such a manner that when the actuator 81 is engaged or actuated, the flow of air through the air lines 109 and 110 is again reversed to its original flow direction.

The air pressure exerted upon the oil level 86 in the oil bottle 85 causes the piston 89 in the cylinder 73 to retract, thus urging the brush arm 43 normally toward a parallel position with the control arm 40. Thus, the air pressure within the oil bottle 85, which is controlled by the regulator 97, ultimately determines the pressure of the brushes 55 and 56 against the side of the vehicle 68.

Figure 7:
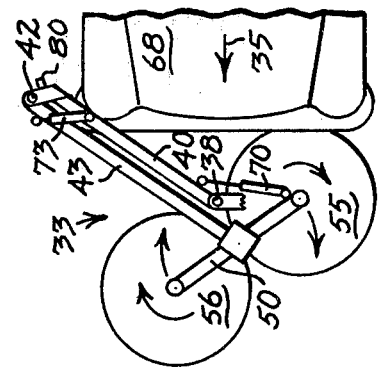

FIG. 7 discloses the brush assembly 33 in its normal initial positon as the front of the vehicle 68 begins to engage one of the rotary brushes 55. In this initial position, the brush arm 43 is substantially parallel to the control arm 40, both of which extend in an angular outboard position relative to the longitudinal direction 35 of the vehicle 68.

The brush motor 58 is actuated to drive the brushes 55 and 56 in the rotary directions of the arrows (FIGS. 1 and 7). Thus, as the vehicle 68 engages the brush 55, the brush 55 begins cleaning the left-hand side of the front of the vehicle.

Figure 8:
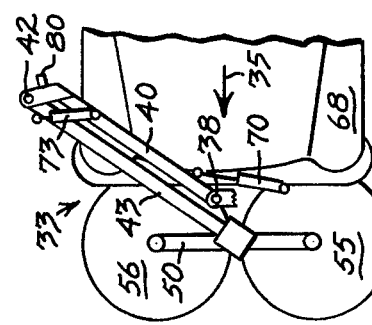

Continued forward motion of the vehicle 68 causes the brush beam 50 to pivot about the vertical axis of the drive shaft 59 so that the brush 56 engages the right-hand side of the front of the vehicle 68, as disclosed in FIG. 8.

Figure 9:
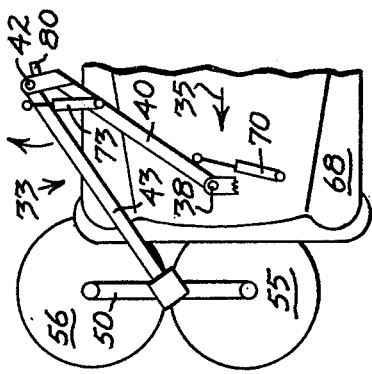

As disclosed in FIG. 9, continued forward movement of the vehicle 68 forces the brush arm 43 away from the control arm 40, moving the piston rod 74 outward from the cylinder 73, which forces both of the brushes 55 and 56 toward the right of the vehicle. This movement of the brushes 55 and 56 is assisted by the rolling movement of the brushes toward the right across the front of the vehicle 68 produced by the direction of rotation of the brushes 55 and 56.

Figure 11:
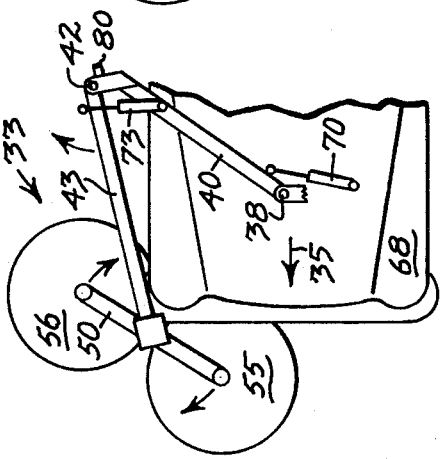

FIGS. 10 and 11 disclose subsequent forward progression of the vehicle 68 causing further separation of the brush arm 43 from the control arm 40, continued clockwise pivotal movement of the brush beam 50 relative to the brush arm 43 and continued movement of the brushes 55 and 56 around the right front corner of the forward moving vehicle 68.

Figure 12:
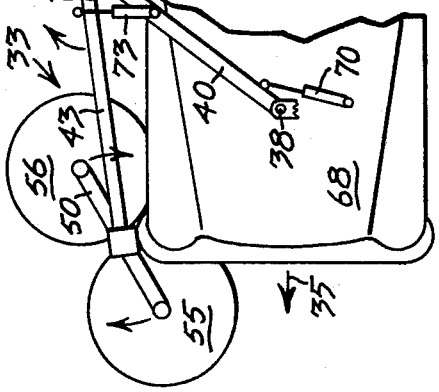

As the brushes 55 and 56 nearly complete their turning movement about the right front corner of the vehicle 68, the brush beam 50 pivots to a very small acute angle between the brush beam 50 and the brush arm 43. It is in this positon that the cam switch 77 engages the actuator 76 of the control valve 75 causing a reversal of flow in the air lines 109 and 110. Air then flows through the line 109 into the bottle 100 depressing the oil level 101, thereby retracting the piston 104 within the cylinder 70. The control arm 40 begins its swinging movement from its outboard position disclosed in FIG. 12, in the direction of the arrow disclosed in FIG. 3, toward a rearward longitudinal position. Progressive movements of the control arm 40 toward its rearward position are disclosed in FIGS. 13–16. In FIG. 16, the control arm 40 has reached the limit of its rearward movement. Also, as the control arm 40 moves from its outboard position in FIG. 13 to its rearward position in FIG. 16, the brush arm 50 maintains a substantially parallel attitude relative to the side of the vehicle 68 so that both brushes 55 and 56 rotate with substantially equal pressure against the right side of the vehicle to clean the same, while the acute angle between the brush beam 50 and the brush arm 43 gradually increases.

Figure 13:
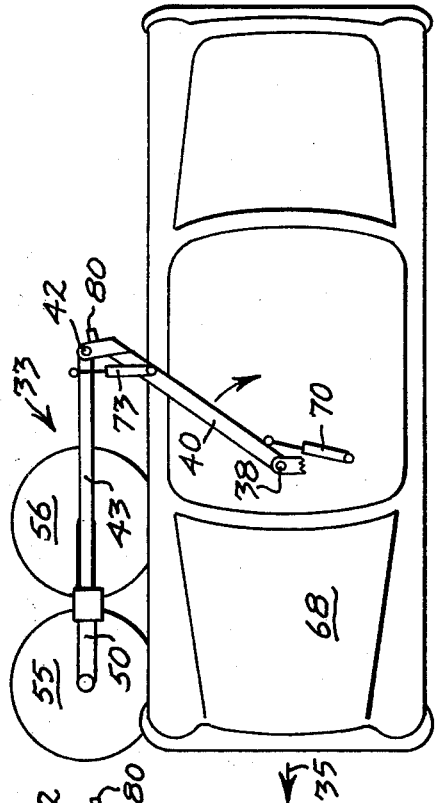

It will be noted in FIG. 13 that the brush beam 50 is in substantial longitudinal alignment with the brush arm 43, so that the cam switch 77 has passed its actuating position. However, in FIG. 14, the brush beam 50 is moving back away from the brush arm 43. But, when the cam switch 77 moves back across the valve operator 76, no action is taken because the valve operator 76 is a one-way operator.

In FIG. 17, the rotary brushes 55 and 56 begin rounding the right rear corner of the vehicle 68. Even though the brush beam 50 rotates through the acute angle for actuating the control valve 75 in FIGS. 17 and 18, nevertheless the cylinder 70 has already reached its maximum retraction, and therefore no further movement of the control arm 40 is caused by the reactuation of the control valve 75.

As the brushes 55 and 56 continue to move around the right rear corner of the vehicle 68, the continuous oil pressure within the pressure cylinder 73 causes the brush arm 43 to move toward the control arm 40, as disclosed in FIGS. 17–20. Such movement of the brush arm 43, with control arm 40 already extending rearwardly, compels the brushes 55 and 56 to clean a substantial part of the rear end of the vehicle 68, before the forward moving vehicle 68 disengages the brushes 55 and 56.

In FIG. 19, the brush arm 43 has converged toward the control arm 40 substantially close enough to cause the brush arm 43 to engage the actuator 81 in the re-set cylinder 80, as best disclosed in FIG. 23, to actuate the control valve 75. The flow of air through lines 109 and 110 is again reversed, causing the cylinder 70 to protract the piston rod 71 to return the control arm 40 gradually to its original outboard position, as disclosed in the sequential FIGS. 20–22. This outboard movement also assists the brushes 55 and 56 in remaining longer in cleaning engagement with the rear surface of the vehicle 68.

It will be noted in FIGS. 8 and 20 that the entire front and rear surfaces of the vehicle 68 are cleaned, as well as the entire right side of the vehicle 68, with only one pass of the vehicle 68 through a single brush assembly 33.

It will also be noted in FIGS. 8–11, that the right-hand side of the front surface is cleaned twice by first the brush 56 and then the trailing brush 55. In a similar manner, as viewed in FIGS. 18–21, the right side of the rear surface of the vehicle 68 is also cleaned twice, first by the brush 56 and subsequently by the brush 55.

When a pair of brush assemblies 33 and 34 (FIG. 1) are employed, the front and rear surfaces of the vehicle 68 are cleaned three times, with certain middle portions of the front and rear surfaces being cleaned four times.

The brush assembly 34 is identical to the brush assembly 33, except that it is located on the opposite side of the car 68 and the brushes clean not only the front and rear surfaces but the left-hand side of the vehicle 68 as it moves forward through the apparatus 30. The brushes 55' and 56' are driven in a direction of rotation disclosed in FIG. 1 so that there will be a natural rolling movement across the front and along the sides of the vehicle as the brushes 55' and 56' engage the surfaces of the vehicle.

Even though the brushes 55, 56, 55' and 56' are driven in the direction of rotation to cause corresponding rolling movement of the brushes over the corresponding surfaces of the vehicle, nevertheless the front and rear surfaces engaged by both sets of brushes will be subjected to brushing in opposite directions in order to more effectively dislodge dirt from the corresponding surface of the vehicle.

The axis of the drive shaft 59 is preferably centered between the ends of the brush beam 50 so that the brush beam 50 and the brushes 55 and 56 will be balanced.

The arrangement of the balanced brushes 55 and 56, on the beam 50, as well as the pivotal arrangement of the brush arm 43 and the control arm 40, are such as to permit a complete and improved cleaning action in a shorter length of travel for the vehicle 68 through the apparatus 30.

What is claimed is:

1. In a vehical washing apparatus including a frame having a longitudinal axis coinciding with the path of movement of the vehicle through the apparatus, a double wraparound brush assembly comprising:
    a. a control arm having first and second ends,
    b. mounting means pivotally supporting said first end upon said frame for pivotal movement of said control arm about a first vertical axis,
    c. a brush arm having first and second ends,
    d. means connecting the first end of said brush arm to the second end of said control arm for relative, pivotal movement about a second vertical axis,
    e. a brush beam having opposite ends,
    f. means journalling the middle portion of said brush beam to the second end of said brush arm for free rotary movement about a third vertical axis,
    g. rotary brush means journaled at each end of said brush beam for rotary movement about vertical brush axes,
    h. means for driving said brush means,
    i. biasing means constantly urging said brush arm toward said control arm, said biasing means yielding to the pressure exerted between the vehicle moving along said path against said brush means to force said brush means to move from the front of said vehicle along the side of said vehicle,
    j. positioning means to position said control arm at a substantially outboard position while said brush means is in front of, and engaging the side of, said vehicle,
    k. means for swinging said control arm to a substantially longitudinal inboard position causing said brush means to swing across the rear surface of said vehicle as the vehicle moves forward along said path, and
    l. a rotary position sensor adapted to be actuated by the change in rotary movement between said brush beam and said brush arm as said brush means moves from the front of the vehicle, moving forward along said path, to a position engaging the side of said forward-moving vehicle, said rotary position sensor being operatively connected to said means for swinging said control arm, so that actuation of said sensor causes said control arm to swing toward its inboard longitudinal position.

2. The invention according to claim 1 further comprising a re-set sensor operatively connected to said means for swinging said control arm and operable by the conversion of said brush arm and said control arm to a predetermined angular position, to cause said swinging means to swing said control arm to its substantially outboard position.

3. The invention according to claim 1 in which the means for swinging said control arm comprises fluid cylinder means, and said rotary position sensor comprises a control valve adapted to be actuated by the change in rotary position between said brush beam and said brush arm for reversing the flow of fluid in said fluid cylinder means.

* * * * *